Jan. 22, 1935.     F. E. STERNS     1,988,986
SKID PREVENTER
Filed Aug. 29, 1933     2 Sheets-Sheet 1
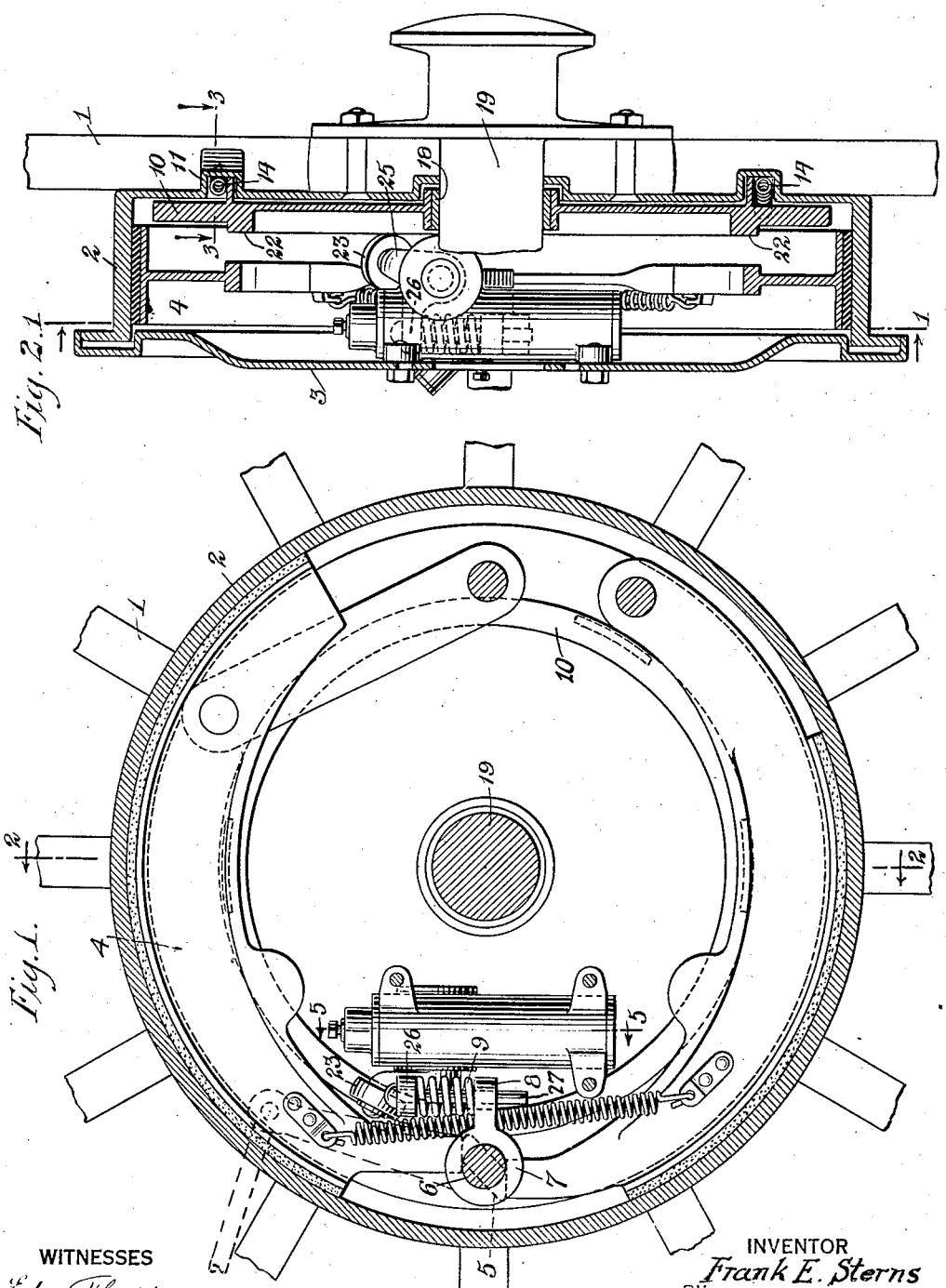
WITNESSES
INVENTOR
Frank E. Sterns
BY
ATTORNEY

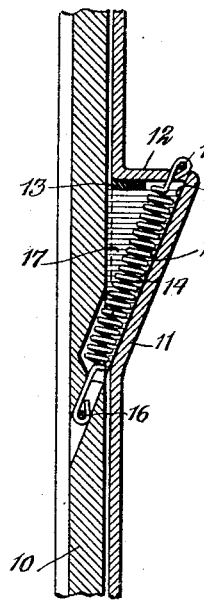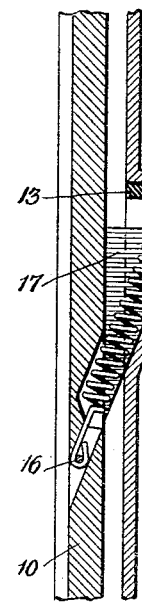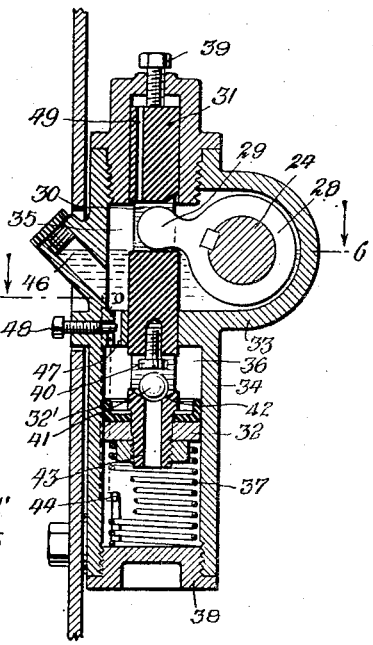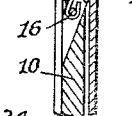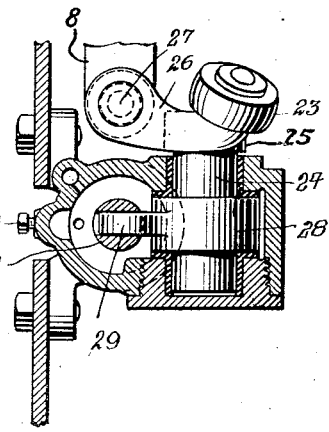

Patented Jan. 22, 1935

1,988,986

UNITED STATES PATENT OFFICE 1,988,986

SKID PREVENTER

Frank E. Sterns, St. Catherines, Ontario, Canada

Application August 29, 1933; Serial No. 687,352

14 Claims. (Cl. 188—181)

This invention relates to a device for preventing vehicles from skidding, the object being to provide a skid preventer for road vehicles to prevent them from skidding on slippery roads when the brakes have been applied with sufficient force to keep the wheels from turning.

Another object of the invention is to provide an improved construction adapted to be applied to road vehicles whereby the effective stopping power of the brakes will be increased when they have been applied with sufficient force to keep the wheels from turning.

A further object, more specifically, is to provide an improved construction coacting with the wheels of a road vehicle for automatically releasing the applied braking power sufficiently to allow the wheels of the vehicle to resume rotation when they have been prevented from turning, the structure being such as to permit a rapid increase in the braking power when the wheels are again turning, to an extent nearly but not quite sufficient to prevent the wheels from turning, after which further increase is permitted only slowly if at all.

In the accompanying drawings—

Figure 1 is a vertical sectional view through the braking mechanism of an automobile or other road vehicle, the same being taken approximately on the line 1—1 of Figure 2;

Figure 2 is a sectional view through Figure 1 on the line 2—2;

Figure 3 is a detailed sectional view showing part of a flywheel and spring returning structure; the same embodying certain features of the invention;

Figure 4 is a view similar to Figure 3 but showing the parts in a different position;

Figure 5 is a sectional view through Figure 2 on the line 5—5;

Figure 6 is a transverse sectional view through Figure 5 on the line 6—6;

Figure 7 is an enlarged fragmentary sectional view illustrating a modified form of relief valve to that shown in Figure 5;

Figure 8 is a fragmentary view showing an arrangement of springs and associated parts similar to Figure 3, but illustrating a slight modified construction;

Figure 9 is a view similar to Figure 8 except that the parts have been separated somewhat.

Referring to the accompanying drawings by numerals, 1 indicates a wheel of a road vehicle as, for instance, an automobile, and 2 the brake drum connected with the wheel. It will be understood that a specific brake drum and associated parts have been shown, but this showing is merely for the purpose of illustration. It will be understood that the invention may be applied to various forms of brakes without departing from the spirit of the invention. In the various brakes now in common use means have been provided including a foot pedal for causing the brake to function. In many instances the operator presses on the brake pedal with such force that the wheels are prevented from rotating and are made to slide upon the road. This is more likely to happen when the road is slippery since then a smaller force upon the brake will prevent the wheels from turning. When the wheels slide they lose their power of directing the automobile, since they can slide in any direction as readily as forward. The automobile soon starts to swing around or skid and often leaves the road. Also, when the wheels slide on the road they exert a smaller retarding force on the vehicle than could have been exerted by them if they did not slide, since the kinetic friction exerted when sliding is less than the static friction that can be developed when not sliding. In the present invention means have been provided for automatically substantially instantly releasing the braking power on a wheel when the wheel is prevented from rotating, by an amount sufficient to permit it again to continue to rotate and then increasing the braking power by an amount which will develop approximately the maximum retarding force upon the vehicle. In carrying out this idea a flywheel is provided which is set in rotation by power from the wheel as the automobile or other vehicle moves forwardly. When the brake is applied with such force that the wheel is prevented from rotating, the flywheel will continue to rotate and will act on the member which applies the braking action to reduce the force of the application thereon until the wheel again grips the road and resumes its proper speed of rotation. This action will, of course, reduce the speed of the flywheel due to the work done in actuating the brake relieving mechanism. When the wheel resumes its proper speed of rotation this reduction in the speed of the flywheel will cause it to move back to its former position whereby it is ready to function a second time when necessary. After the wheel has again begun to revolve at its proper speed and ceased to slide on the road, so that it is again capable of exerting full static friction with the road, the ideal method of controlling the brake, in order to obtain the maximum stopping effect upon the vehicle, would be to allow the force of the application of the brake to increase as rapidly as possible to a value just under that which would cause the wheel to slip, and after this increase to hold the parts at this value.

Without other provision, the return of the flywheel to its former position would, however, allow the brake to be quickly re-applied with its former force, if the operator has maintained his pressure on the foot pedal, and the wheel would again be made to slip. The present invention therefore presents means which will limit the amount of rapid increase in the force of application of the brake to an amount which will produce the maximum stopping effect, or slightly below the maximum, to avoid again slipping the wheel. The present invention also presents means for holding the braking force at the optimum value thus reached until released by the operator and alternative means for permitting the braking force to increase slowly until the wheel is again slipped when the flywheel will again operate to reduce the braking force and cause the wheel to resume rotation and the mechanism for limiting the increase in the braking force will again restore it to the optimum value. Using either of these means the slipping of the wheel is stopped immediately after it begins, thus preventing skidding of the vehicle, and the average stopping effect of the brakes upon the vehicle is kept close to the maximum possible attainable, which can only be reached when the wheels are not sliding on the road. Referring again particularly to Figures 1 and 2, it will be seen that the invention is shown in a position ready for use and in the position occupied when the vehicle is stationary or moving without sudden change in the speed of rotation of the wheel. The drum 2, as above stated, is of the usual structure and is mounted close to the plate 3 which is bolted or otherwise secured in any desired manner to the axle of the vehicle. Plate 3 is, therefore, mounted stationary at all times, while drum 2 rotates with wheel 1. Coacting with drum 2 are the usual braking shoes 4 which are actuated by a brake operating cam 5. This cam is secured to shaft 6, whereby whenever shaft 6 is rocked, cam 5 will be caused to function.

The parts just described are old and well known and therefore form no part of the present invention except in combination. To the shaft 6 is secured a ring 7 having an apertured lug 8 projecting therefrom. By reason of this construction, whenever shaft 6 is actuated for causing the dog 5 to function to apply the brake shoes 4, lug 8 will be swung in a given direction, namely, against the spring 9.

Before these parts are caused to function it will be evident that the vehicle must be started and moving over the roadway. As the vehicle moves over the roadway the flywheel 10 is rotated by the wheel 1 and rotates at the same speed as wheel 1. In order to accomplish this result the brake drum 2 is provided with a plurality of pockets 11. For most practical purposes there are provided six pockets 11 though a greater or less number might be used without departing from the spirit of the invention.

As all the pockets are identical the showing in Figures 2 and 3 will be sufficient to illustrate the construction. As shown in these figures the pockets taper and are provided with shoulders 12 against which fits a rubber bumper 13. It will be understood that preferably there are only two bumpers used, although there may be six or more pockets 11, and these bumpers are arranged preferably on diametrically opposite sides. Also, in two of the pockets preferably on diametrically opposite sides are arranged springs 14. These springs may be in the same pockets as the bumpers, or they may be in other pockets. As shown in Figure 4, each of these springs is anchored at 15 to the abutment 12, and at 16 to the flywheel 10, whereby these springs will give a continuous tendency to the flywheel to remain as shown in Figures 2 and 3. In addition, a wedge shaped lug 17 is formed either integral with the flywheel or rigidly secured thereto for each of the pockets 11, said wedges fitting into the pockets continually but to a greater or less extent according to circumstances hereinafter fully described.

Preferably the respective springs 14 are under tension, though when the parts are in the position shown in Figure 3 the tension is very slight. This arrangement causes the flywheel 10 to move back to its neutral or inoperative position, as shown in Figure 2, when not functioning as a brake release mechanism. Flywheel 10 is mounted on a suitable bearing sleeve 18 carried by the shaft 19. The flywheel is loosely mounted on shaft 19 through the sleeve or bearing 18 so that it may freely rotate with the wheel 1 or when the wheel 1 is held against rotation. When the vehicle is moving over the road in the usual way the parts will remain substantially as shown in Figure 2. However, if the brakes are applied to such an extent that the wheel 1 is stopped from rotation rather suddenly, the flywheel 10 will continue to rotate and by reason of the cam surfaces 20 and 21 on the wedges 17 and the bottom of the pockets 11, will move laterally. The flywheel 10 is provided with an annular bead or track 22 which functions when the flywheel is moving laterally. It will be understood that the flywheel will be rotating and moving laterally simultaneously, and as it moves the track or bead 22 will strike the roller 23 and swing the same and shaft 24. It will be understood that this swinging movement is not very great but is sufficient to secure the results desired.

The wheel 23 is mounted on one arm of the bell crank lever 25, and the other arm 26 fits over one end of the spring 9 (Fig. 1) and compresses this spring whenever wheel 23 is swung over by the flywheel. A pin 27 extends through the aperture in the arm 26, through spring 9 and through the aperture in the extension or lug 8. This is merely to hold the spring in place so that whenever the arm 26 presses downwardly on spring 9 power will be transmitted to lug 8, and as this is preferably integral with ring 7, and as ring 7 is rigidly secured to shaft 6, said shaft will be rotated in the reverse direction for releasing somewhat the dog 5 and, consequently, releasing somewhat the brake shoes 4. The parts are so proportioned that this releasing action will be sufficient to permit the wheel to rotate again at the proper speed in proportion to the speed of the vehicle at that moment. It will be evident, of course, that the one who has operated the brake mechanism, not at first realizing that he has slipped the wheels, since no skidding will have occurred because the rotation of the wheels was promptly restored, will probably maintain his pressure on the brake pedal, and when the wheel 1 again rotates and the flywheel returns toward the position shown in Figure 3, the wheel 23 and the shaft 24 will be swung by the thrust of spring 9 toward the position shown in Figure 2, thus reducing the compression of the spring 9 and consequently reducing the pressure applied through it to the lug 8, and allowing dog 5 urged by the pressure maintained by the operator, to again increase the force of the application of the brake. It is desirable that this should take place and should proceed as rapidly as possible until the braking force has nearly reached the value which will slip the wheel, in order to obtain the maximum stopping effect upon the vehicle, and should then be nearly or entirely stopped. For this reason means have been provided for permitting a rapid movement of the bell crank lever 25 toward the position shown in Figure 2 for a short distance which should be predetermined in each case to suit the characteristics of the brake mechanism so as to allow the braking force to approach, but not to exceed, the value which would slip the wheel. This mechanism, which may be termed a holding mechanism, is shown particularly in Figures 5 and 6. As the wheel 23 is forced over by the flywheel 10, shaft 24 is rocked. Keyed or otherwise rigidly secured to this shaft is a ring 28 which is provided with an integral extension 29 extending loosely into the aperture or passageway 30 formed in the piston rod 31 of piston 32. It will be noted in Figure 5 that the ring 28 is located in the housing 33 which with part of the casing 34 forms a chamber 35. Below chamber 35 is a second chamber 36 in which piston 32 is mounted. A spring 37 acts on the removable bottom 38 of casing 34 and on piston 32 to give the piston a continuous tendency to move upwardly to the position shown in Figure 5. This is the upward extreme movement by reason of the adjustable abutment 39. Piston rod 31 carries an adjustable abutment 40 which limits the upward movement of the ball valve 41, which ball valve normally rests on the valve seat 42 so as to prevent oil from passing downward through the passage 43 formed through the lower end of the piston rod 31. The abutment 40 is always a short distance from the ball valve 41 except when the ball has been raised. A comparatively small passageway or main bypass 44 is provided and extends from near the bottom of chamber 36 to the lower part of chamber 35. Therefore, when oil is fed into chamber 35 through the feeding opening 46 the oil will pass downwardly into the lower part of chamber 36 and will fill or partly fill chamber 35. In addition, some of the oil passes through the vent or auxiliary bypass 47 or through the passage 43 and fills the upper part of chamber 36.

When the parts are in normal position the oil is substantially at the level shown in Figure 5 with chamber 36 completely filled with oil above and below the piston 32. A needle valve 48 is provided near the auxiliary bypass 47 whereby the opening in this bypass may be varied as may be desired. When the flywheel 10 functions to swing the bell crank lever 25 over to its operative position, rock shaft 24 will be moved and also ring 28 and extension 29, so that piston 31 will be forced downwardly rather quickly. There will be very little retarding movement to the quick downward movement of the piston because the bore 43 in the lower end of the piston rod is rather large. It will be understood that, if desired, the passage 43 which connects the lower and upper parts of the chamber 36 may be formed in the wall of the chamber with the valve 41 mounted therein so as to function in the manner described above without departing from the spirit of the invention. The portion of the oil displaced from the lower part of chamber 36 which is not required to fill the upper part of chamber 36 on account of this part of the chamber being partly filled by the piston rod, will pass through the passage 44 into the chamber 35. The size of the opening from the passage 44 into the chamber 35 is made so small in proportion to the size of the bore 43 that the upper part of chamber 36 will always be kept filled with oil, however rapidly the piston may be depressed. As the oil is free to escape from the lower part of the chamber 36 there will be little resistance to the downward movement of the piston except that the spring 37 will be compressed somewhat. However, the piston is provided with a cup-shaped washer 32' which faces upwardly as shown in Figure 5 whereby any quick return of the piston is checked as soon as the upward movement of the piston has closed valve 41 so that the only escape for the oil in the upper part of chamber 36 is through the bypass 47.

It will be seen from Figure 5 that as piston 32 moves upwardly slowly the oil will pass through the auxiliary bypass 47 into chamber 35 and then through the passageway or main bypass 44 downwardly into the lower part of the chamber 36 below the piston 32. An air vent or bypass 49 is provided in the upper part of piston rod 31 whereby this rod may be free to function after the set screw or abutment 39 has been properly adjusted. To insure the utmost freedom of operation of the parts the upper part of chamber 35 is not filled with oil.

When the wheel 23, the bell crank lever 26 and the shaft 24 are swung toward the position shown in Figure 2 by the spring 9, the ring 28 will swing with them and after moving a short distance the top of its extension 29 will come in contact with the top of the aperture 30 and begin to raise the piston rod 31 and the piston 32. When the piston has been raised a short distance the valve 41 will be closed. While the extension 29 is traversing the clearing space shown in Figure 5, between it and the top of the aperture 30, there will be no resistance to the movement of the shaft 24 and the parts associated with it, and while the extension 29 is moving the further slight distance necessary to raise the piston sufficiently to close the valve 41 there will be very little resistance to the movement of these parts. The movement of shaft 24 and the parts associated with it through the distance necessary to cause the extension 29 to traverse the clearance space and raise the piston sufficiently to close valve 41 will, therefore, be rapid and will produce a rapid reapplication of the brake to a limited extent. When valve 41 is closed the rapid movement of the piston 32 and of the shaft 24 and the associated parts will be stopped by the inability of the oil to escape from the upper part of the chamber 36 except slowly through the bypass 47. The amount of return movement which the shaft 24 and associated parts are thus permitted to make rapidly is made such that the effective braking force is thereby permitted to increase nearly, but not quite, to the value which would slip the wheel. The slow upward movement of the piston permitted by the escape of oil through the bypass 47 will allow the effective braking power slowly to increase still further until it again stops the wheel from rotating. When this latter action takes place the flywheel 10 begins to function to produce a releasing action on the brake applying structure. This action is sufficient to release the brake shoes sufficiently to permit the wheels of the vehicle to again rotate at a speed in proportion to the speed of the vehicle. In addition, by reason of the piston 32 and associated parts means are provided for allowing the pressure maintained by the operator on the brake pedal to increase the braking power rapidly until a value closely approximating the maximum possible is again reached. As soon as the flywheel 10 has functioned and the brake shoes 4 have been released and the wheel of the vehicle has again begun to rotate at its proper speed, the springs 14 will begin to function, because the action described will cause a reduction in the rotary speed of the flywheel. These springs will continue to function until the flywheel has been restored to its former neutral position, as shown in Figure 2. After the brake has been applied and released and the vehicle again started, if it has been stopped, the wheels and other parts will function in the usual manner and the parts of the invention will be in condition for functioning a second time in case the brakes are again applied to stop the rotation of the wheels, in which case the flywheel will function as just described, first to release the brake shoes somewhat, and secondly to allow a rapid reapplication of the brake shoes limited to the amount which will produce nearly the maximum possible stopping effect without slipping the wheel followed by a slow further increase.

In Figure 7 a slightly modified structure is shown to that shown in Figure 5. Instead of having a needle valve 48 as shown in Figure 5, there is provided a check valve 51 in Figure 7, held in place by a perforated cover 50 and provided with a light spring 52 tending to open it. Aside from the check valve 51, the spring 52 and the cover 50, the parts are identical with that shown in Figure 5 and, therefore, need no additional description. The spring 52 is not strong enough to open the valve 51 when the oil pressure in the upper part of the chamber 36' is large due to a considerable force being exerted by the extension 29 to raise the piston as would be the case when the piston is holding the brake in partial release, against the force exerted by the operator, in the position reached after the rapid increase in the braking force to the value which will nearly slip the wheel. With this modified structure there is no slow increase in the braking force after this position is reached, and the piston is held in this position until the operator releases his pressure on the brake. When this is done the oil pressure in the upper part of chamber 36' falls to that which is produced by the action of spring 37 alone. The spring 52 is strong enough to open the valve 51 against this reduced pressure, thus allowing oil to escape through the valve 51 from the upper part of chamber 36' and the piston to be raised to the position shown in Fig. 5 by the action of the spring 37, so as to be in readiness for functioning a second time. This construction causes the holding mechanism to function in the manner previously described except that after the piston has permitted the limited rapid increase in the braking force to take place it permits no further slow increase. It will be understood that instead of providing the ball valve 51 and the spring 52 a spring of suitable strength may be provided tending to open the valve 41 so as to allow oil to escape through it from the upper part of chamber 36' when the operator releases his pressure on the brake substantially in the manner described without departing from the spirit of the invention.

When utilizing the invention on a vehicle it will be understood that the same may be used on the front wheels as well as on the rear wheels in connection with a mechanical or hydraulic braking structure, power operated or operated by foot, as may be desired. It will also be understood that, if desired, the invention may be used on vehicles which are intended to travel in either direction with equal facility by making the cams on the flywheel and the pockets in the brake drum inclined in both directions so that the flywheel will be moved laterally when rotated from its neutral position in either direction.

In the construction shown in Figs. 8 and 9 the abutment 12 and the rubber bumper 13 are not required, since their functions will be performed by that pair of cam surfaces 20' and 21' in Fig. 9 which were not in contact with each other when the flywheel was displaced from its normal position. Should the flywheel return to its normal position with sufficient speed, it might not be entirely stopped by these surfaces coming in contact with each other and might go a little past the normal position in the other direction. Should this occur, the flywheel would be returned to the normal position by the action of those springs 14' in Fig. 9 which would be stretched by its so going past the normal position.

While in the accompanying drawings a specific structure has been shown, it is of course understood that the invention is applicable to other forms of brake mechanism, either to the front or rear wheel, or to wheels which may be steering or not steering. The device produces no unnecessary reduction of braking force such as reducing the braking force of one or both of the front wheels when they are turned from the straight ahead position, but rather it enables greater stopping effect to be exerted on the vehicle than could otherwise be obtained except by chance. It is, of course, evident that as soon as any wheel slips on the road due to the action of the brake, the braking force or effect, as far as the vehicle is concerned, is reduced sufficiently by the present invention to allow it to again grip the road, and as soon as the wheel begins again to revolve at its proper speed the braking force is rapidly increased as much as can safely be done without risking the slipping of the wheel. By thus preventing the slipping of the wheel, skidding of the vehicle is prevented on a turn or on a straight ahead course however slippery the road may be, and also by causing the brake to only function up to a point where the wheel is about to stop rotating a greater effect upon the vehicle is produced than could be produced by causing the wheels of the vehicle to slide, since the coefficient of static friction is more than that of kinetic friction.

I claim:—

1. The combination with a vehicle having brakes including a braking member connected to the wheels of the vehicle, of means for quickly releasing the brakes sufficiently to allow said wheels again to rotate and thus prevent skidding of the vehicle when the brakes have been applied sufficiently to cause said wheels to stop rotating and for allowing the braking action to increase quickly when the said wheels again rotate, and means for stopping the said increase in braking action immediately before the brakes reach a point where they would lock the wheels of the vehicle so as to produce the greatest possible stopping effect upon the vehicle.

2. The combination with a vehicle provided with wheels and a brake for said wheels, of means automatically functioning when the brakes are operated to a position for suddenly preventing rotation of the wheels, said means including a flywheel, a mechanism operated by said flywheel for reducing the braking action when the brakes have stopped the rotation of the wheel, said reducing action functioning until the wheels again rotate and then allowing it to increase up to the point immediately before locking the wheels and means for limiting said increase.

3. In a device of the character described, the combination with a wheel and braking mechanism for stopping the rotation of the wheel or retarding the rotation thereof, of a flywheel, means for causing the flywheel to normally rotate at the same speed as said wheel, said means acting to cause the flywheel to move laterally when the speed of the flywheel exceeds that of said wheel, a bell crank lever moved by said flywheel when the same is moved laterally, means actuated by said bell crank lever when said braking mechanism has stopped the rotation of the wheel for temporarily reducing the braking action of the braking mechanism sufficiently to permit said wheel to rotate, and a dashpot structure for stopping the reapplication of the braking action to the braking mechanism beyond a certain degree.

4. In a device of the character described, the combination with a vehicle having wheels and a braking structure therefor, of means for releasing the braking structure sufficiently to allow the wheels of the vehicle again to rotate when the said braking mechanism has been applied sufficiently to stop the rotation of the wheels of the vehicle, said means including a flywheel set in motion by the rotation of the wheels of the vehicle, means for causing said flywheel to move laterally and still rotate when the wheels of the vehicle have been stopped from rotation by the braking mechanism, a pivotally mounted bell crank lever positioned so that one end will be engaged by said wheel as it moves laterally whereby the bell crank lever will be swung in a given direction, means coacting with one end of said bell crank lever and acting on said braking mechanism for releasing the braking mechanism as the bell crank lever functions, and means for allowing the braking mechanism to be reapplied rapidly to a given extent and then, if further reapplied, reapplied slowly.

5. In a device of the character described, braking mechanism including a brake drum formed with a plurality of sockets with inclined bottoms, a brake shoe and means for applying the brake shoe, a rotatable flywheel having an inclined cam fitted in each of said sockets whereby when the brake drum rotates slower than the flywheel said flywheel will be moved laterally, a bell crank lever positioned so that one end will be engaged by said flywheel and moved as the flywheel moves laterally, means for transmitting power from the opposite end of said bell crank lever to the means for causing the brake shoes to function whereby the brake shoes are released.

6. A braking system for vehicles comprising brakes on certain of the wheels of the vehicle, each of said brakes including a drum having brake shoes coacting therewith, means for actuating said brake shoes so as to produce a braking action on said wheels, and means for releasing said brake shoes when moved to a position for stopping the rotation of said wheels, said means including a flywheel and a bell crank lever actuated by the flywheel, said bell crank lever at one end pressing on the means for applying the brake shoes, the parts being so proportioned that said pressure will be sufficient to release said brake shoes.

7. In a device of the character described, a brake mechanism for vehicles, and means for automatically releasing the brake mechanism when the brake mechanism has suddenly stopped the rotation of the wheels of the vehicle, said releasing means including a bell crank lever adapted to move the brake mechanism in a reverse direction, a flywheel for actuating the bell crank lever, and spring means for returning the flywheel to its normal position after each actuation.

8. In a device of the character described, the combination with a brake mechanism adapted to be connected to the wheels of a vehicle for retarding or stopping the rotation thereof, of means for releasing said brake mechanism and then allowing a controlled reapplication thereof, said means including a loosely mounted flywheel, means extending from the flywheel positioned to engage part of the brake mechanism connected to the wheels of the vehicle whereby the flywheel will normally rotate at the same speed as the wheels of the vehicle, said means engaging the braking mechanism acting to force the flywheel laterally when the brake mechanism stops the rotation of the wheels, a pivotally mounted bell crank lever positioned to be swung to an operative position by said flywheel when the same moves laterally, means actuated by said bell crank lever for releasing said brake mechanism, and a dashpot structure also actuated by said bell crank lever for causing the reapplication of the brake mechanism to take place quickly to a given extent, and then slowly, said dashpot structure including a swingable arm actuated by the bell crank lever, a piston rod moved by said arm, a piston connected with said piston rod, and a casing for said piston rod, arm and piston, said casing being divided into an upper chamber and a lower chamber, a liquid filling for said chambers, said piston being in the lower chamber, a check valve vent carried by said piston and positioned so that it will open as the piston moves downwardly and close as it moves upwardly, said casing having a main bypass extending from the lower part of the casing to the upper part of the casing, means forming a division wall between the upper and lower chambers having an auxiliary bypass formed therein, and means for varying the size of the auxiliary bypass whereby as said bell crank lever and arm have functioned, the bell crank lever, arm and braking mechanism are held against return movement by the action of said piston, said holding means being such that the parts are gradually released as said fluid from the lower part passes into the upper part.

9. In a device of the character described, the combination with a brake mechanism adapted to be connected to the wheels of a vehicle for retarding or stopping the rotation thereof, of means for releasing said brake mechanism and then allowing a controlled reapplication thereof, said means including a loosely mounted flywheel, means extending from the flywheel positioned to engage part of the brake mechanism connected to the wheels of the vehicle whereby the flywheel will normally rotate at the same speed as the wheels of the vehicle, said means engaging the braking mechanism acting to force the flywheel laterally when the brake mechanism stops the rotation of the wheels, a pivotally mounted bell crank lever positioned to be swung to an operative position by said flywheel when the same moves laterally, means actuated by said bell crank lever for releasing said brake mechanism, and a dashpot structure also actuated by said bell crank lever for limiting to a given amount the reapplication of the brake mechanism, said dashpot structure including a swingable arm actuated by the bell crank lever, a piston rod moved by said arm, a piston connected with said piston rod, and a casing for said piston rod, arm and piston, said casing being divided into an upper chamber and a lower chamber, a liquid filling for said chambers, said piston being in the lower chamber, a check valve vent carried by said piston and positioned so that it will open as the piston moves downwardly and close as it moves upwardly, said casing having a main bypass extending from the lower part of the casing to the upper part of the casing, means forming a division wall between the upper and lower chambers having an auxiliary bypass formed therein, and means for closing the auxiliary bypass whereby as said bell crank lever and arm have functioned, the bell crank lever, arm and braking mechanism are held against return movement by the action of said piston, said closing means being such that when the force tending to cause return movement of the braking mechanism is released the closing means will open and allow said fluid to pass from the lower part into the upper part, said holding means being such that the parts are released as said fluid from the lower part passes into the upper part.

10. The combination with a vehicle having brakes including a braking member connected to the wheels of the vehicle, of means for quickly releasing the brakes sufficiently to allow said wheels again to rotate and thus prevent skidding of the vehicle when the brakes have been applied sufficiently to cause said wheels to stop rotating and for allowing the braking action to increase quickly when the said wheels again rotate, and means for reducing the speed of said increase in braking action a short time before the brakes reach a point where they would lock the wheels of the vehicle so as to produce the greatest possible stopping effect upon the vehicle.

11. The combination with a vehicle having brakes including a braking member connected to the wheels of the vehicle, of means for quickly releasing the brakes sufficiently to allow said wheels again to rotate and thus prevent skidding of the vehicle when the brakes have been applied sufficiently to cause said wheels to stop rotating and for allowing the braking action to increase quickly when the said wheels again rotate, and means for regulating the said increase in braking action in such a manner as to produce the greatest possible stopping effect upon the vehicle.

12. The combination with a vehicle provided with wheels and a brake for said wheels, of means automatically functioning when the brakes are operated to a position for suddenly preventing rotation of the wheels, said means including a flywheel, a mechanism operated by said flywheel for reducing the braking action when the brakes have stopped the rotation of the wheels until the wheels again rotate and then allowing it to increase up to the point a short time before locking the wheels, means for allowing said reducing action to function until the wheels again rotate and then allowing it to increase, and means for regulating said increase.

13. The combination with a vehicle provided with wheels and a brake for said wheels, of means automatically functioning when the brakes are operated to a position for suddenly preventing rotation of the wheels, said means including a flywheel, a mechanism operated by said flywheel for reducing the braking action when the brakes have stopped the rotation of the wheels, said reducing action functioning until the wheels again rotate and then allowing it to increase, and means for regulating said increase in such a manner as to produce the greatest possible stopping effect upon the vehicle.

14. In a device of the character described, the combination with a wheel and braking mechanism for stopping the rotation of the wheel or retarding the rotation thereof, of a flywheel, means for causing the flywheel to normally rotate at the same speed as said wheel, said means acting to cause the flywheel to move laterally when the speed of the flywheel exceeds that of said wheel, a bell crank lever moved by said flywheel when the same is moved laterally, means actuated by said bell crank lever when said braking mechanism has stopped the rotation of the wheel for temporarily reducing the braking action of the braking mechanism sufficiently to permit said wheel to rotate, and a dash pot structure for regulating the reapplication of the braking action to the braking mechanism in such a manner as to produce the greatest possible stopping effect.

FRANK E. STERNS.